US011483105B2

(12) United States Patent
Lee et al.

(10) Patent No.: US 11,483,105 B2
(45) Date of Patent: Oct. 25, 2022

(54) METHOD AND APPARATUS FOR GENERATING BASEBAND TRANSMISSION SIGNAL IN MOBILE COMMUNICATION SYSTEM SUPPORTING MULTIPLE COMPONENT CARRIERS

(71) Applicant: ELECTRONICS AND TELECOMMUNICATIONS RESEARCH INSTITUTE, Daejeon (KR)

(72) Inventors: Hoo Sung Lee, Sejong-si (KR); Jae Woo Park, Daejeon (KR); Moon Sik Lee, Daejeon (KR); Chan Bok Jeong, Daejeon (KR); Jee Yon Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 46 days.

(21) Appl. No.: 16/953,880

(22) Filed: Nov. 20, 2020

(65) Prior Publication Data

US 2021/0160019 A1    May 27, 2021

(30) Foreign Application Priority Data

Nov. 27, 2019 (KR) .................. 10-2019-0154425
Nov. 13, 2020 (KR) .................. 10-2020-0151478

(51) Int. Cl.
*H04L 5/00* (2006.01)
*H04L 27/26* (2006.01)
*H04W 72/04* (2009.01)

(52) U.S. Cl.
CPC .......... *H04L 5/001* (2013.01); *H04L 27/2605* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 9,544,173 B1 | 1/2017 | Berardinelli et al. | |
| 9,853,706 B2 | 12/2017 | You | |
| 9,871,607 B1* | 1/2018 | Perets | H04L 27/2626 |
| 9,900,886 B2 | 2/2018 | Wild et al. | |
| 10,044,385 B2 | 8/2018 | Kang et al. | |
| 10,250,423 B2 | 4/2019 | Kibutu et al. | |
| 10,567,205 B2 | 2/2020 | Park et al. | |
| 2020/0076663 A1 | 3/2020 | Kazmi et al. | |
| 2020/0169341 A1* | 5/2020 | Hwang | H04B 17/3913 |
| 2021/0352526 A1* | 11/2021 | Kim | H04L 5/0053 |

FOREIGN PATENT DOCUMENTS

WO  WO-2012168926 A2 * 12/2012 ............. H03H 11/52

* cited by examiner

*Primary Examiner* — Diane L Lo
(74) *Attorney, Agent, or Firm* — LRK Patent Law Firm

(57) ABSTRACT

A baseband signal generation method includes mapping frequency-domain data for a plurality of component carriers to subcarrier resources; performing a frequency shift on the frequency domain-data allocated to the subcarrier resources; generating a time-domain signal by performing IFFT on the frequency-shifted frequency-domain data using a single IFFT block; and generating a time-domain baseband signal by adding a CP to the time-domain signal.

17 Claims, 7 Drawing Sheets

FIG. 6

| | Number of subcarriers | Subcarrier indexes 0 ~ 8191 | IFFT input indexes -4096 ~ 4095 |
|---|---|---|---|
| GB | 785 | 0 ~ 784 | -4096 ~ -3312 |
| CC0 | 792 | 785 ~ 1576 | -3311 ~ -2520 |
| GB | 41 | 1577 ~ 1617 | -2519 ~ -2479 |
| CC1 | 792 | 1618 ~ 2409 | -2478 ~ -1687 |
| GB | 41 | 2410 ~ 2450 | -1686 ~ -1646 |
| CC2 | 792 | 2451 ~ 3242 | -1645 ~ -854 |
| GB | 41 | 3243 ~ 3283 | -853 ~ -813 |
| CC3 | 792 | 3284 ~ 4075 | -812 ~ -21 |
| GB | 41 | 4076 ~ 4116 | -20 ~ 20 |
| CC4 | 792 | 4117 ~ 4908 | 21 ~ 812 |
| GB | 41 | 4909 ~ 4949 | 813 ~ 853 |
| CC5 | 792 | 4950 ~ 5741 | 854 ~ 1645 |
| GB | 41 | 5742 ~ 5782 | 1646 ~ 1686 |
| CC6 | 792 | 5783 ~ 6574 | 1687 ~ 2478 |
| GB | 41 | 6575 ~ 6615 | 2479 ~ 2519 |
| CC7 | 792 | 6616 ~ 7407 | 2520 ~ 3311 |
| GB | 784 | 7408 ~ 8191 | 3312 ~ 4095 |

FIG. 8
| 5G NR FR2 | | |
|---|---|---|
| Subcarrier spacing | FFT | Sampling rate |
| 120 | 8192 | 983.04MHz |
| 120 | 1024 | 122.88MHz |
FIG. 9
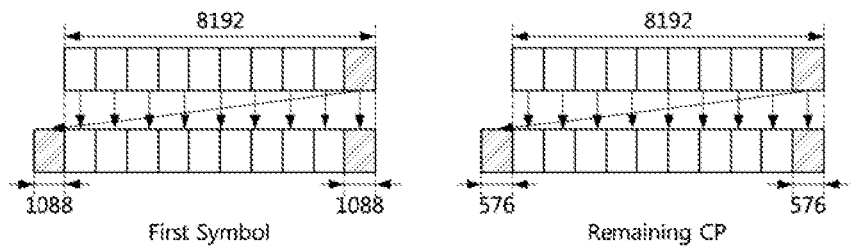
FIG. 10
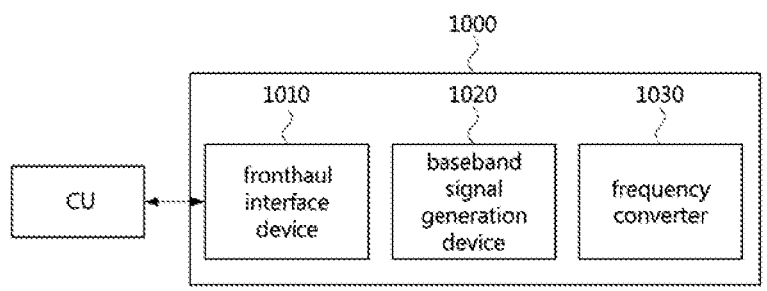

METHOD AND APPARATUS FOR GENERATING BASEBAND TRANSMISSION SIGNAL IN MOBILE COMMUNICATION SYSTEM SUPPORTING MULTIPLE COMPONENT CARRIERS

CROSS-REFERENCE TO RELATED APPLICATIONS

This application claims priority to Korean Patent Applications No. 10-2019-0154425 filed on Nov. 27, 2019 and No. 10-2020-0151478 filed on Nov. 13, 2020 in the Korean Intellectual Property Office (KIPO), the entire contents of which are hereby incorporated by reference.

BACKGROUND

1. Technical Field

The present disclosure relates to a mobile communication system, and more particularly, to a method and an apparatus for generating one baseband transmission signal by transforming frequency-domain signals of a plurality of component carriers into a time-domain signal in a mobile communication system supporting multiple component carriers.

2. Description of Related Art

As the spread of mobile communication terminals such as smartphones and tablet PCs is rapidly increasing, the amount of data to be processed by mobile communication base stations is exploding. In order to satisfy such the user requirements, the standardization for the fifth generation (5G) mobile communication system has been completed, and the 5G mobile communication system is being commercialized.

The 3rd generation partnership project (3GPP) new radio (NR) mobile communication system, which is a representative 5G mobile communication system, may operate in two frequency bands: frequency region 1 (FR1) and frequency region 2 (FR2), and may use a carrier aggregation technique that supports wideband using multiple frequency blocks. The carrier aggregation technique is a technique that supports a wider frequency band by using multiple frequency blocks as one large logical frequency band. In this case, a bandwidth of each frequency block is based on a system bandwidth used in the 5G system, and each frequency block is defined as a component carrier. Meanwhile, in order to use the carrier aggregation technique supporting a plurality of component carriers in the 5G mobile communication system, there is a need for an efficient method for generating baseband signals of the plurality of component carriers.

SUMMARY

Accordingly, exemplary embodiments of the present disclosure are directed to providing a method and an apparatus for generating one baseband transmission signal by transforming frequency-domain signals of a plurality of component carriers into a time-domain signal in a mobile communication system supporting multiple component carriers.

According to exemplary embodiments of the present disclosure, a baseband signal generation method, performed by a signal transmission apparatus, may comprise: mapping frequency-domain data for a plurality of component carriers to subcarrier resources; performing a frequency shift on the frequency domain-data allocated to the subcarrier resources; generating a time-domain signal by performing inverse fast Fourier transform (IFFT) on the frequency-shifted frequency-domain data using a single IFFT block; and generating a time-domain baseband signal by adding a cyclic prefix (CP) to the time-domain signal.

The plurality of component carriers may be contiguous component carriers in frequency domain.

When the signal transmission apparatus is a distributed unit (DU), the frequency-domain data may be received from a central unit (CU) through a fronthaul interface.

Each of the plurality of component carriers may have a data transmission band of 95.04 MHz and a guard band of 4.920 MHz.

Each of the plurality of component carriers may have a 120 Khz subcarrier spacing (SCS), the data transmission band may be composed of 792 subcarriers, and the guard band may be composed of 41 subcarriers.

In the performing of the frequency shift, the frequency shift may be performed so that a first half and a second half of the frequency-domain data allocated to the subcarrier resources are input to the IFFT block as being crossed with each other.

The IFFT block may use a vector input scheme that receives multiple inputs per clock.

The baseband signal generation method may further comprise, in order to align a center frequency of the time-domain baseband signal with a center of a subcarrier, up-converting or down-converting a frequency of the time-domain baseband signal by ½ of a subcarrier spacing.

Furthermore, according to exemplary embodiments of the present disclosure, a baseband signal generation apparatus may comprise: a subcarrier mapping unit for mapping frequency-domain data for a plurality of component carriers to subcarrier resources; a frequency shift unit for performing a frequency shift on the frequency domain-data allocated to the subcarrier resources; an inverse fast Fourier transform (IFFT) unit for generating a time-domain signal by performing IFFT on the frequency-shifted frequency-domain data using a single IFFT block; and a cyclic prefix (CP) addition unit for generating a time-domain baseband signal by adding a CP to the time-domain signal.

The plurality of component carriers may be contiguous component carriers in frequency domain.

When the signal transmission apparatus is a distributed unit (DU), the frequency-domain data may be received from a central unit (CU) through a fronthaul interface.

Each of the plurality of component carriers may have a data transmission band of 95.04 MHz and a guard band of 4.920 MHz.

Each of the plurality of component carriers may have a 120 Khz subcarrier spacing (SCS), the data transmission band may be composed of 792 subcarriers, and the guard band may be composed of 41 subcarriers.

The frequency shift unit may perform the frequency shift so that a first half and a second half of the frequency-domain data allocated to the subcarrier resources are input to the IFFT block as being crossed with each other.

The IFFT block may use a vector input scheme that receives multiple inputs per clock.

The baseband signal generation apparatus may further comprise a baseband frequency conversion unit for up-converting or down-converting a frequency of the time-domain baseband signal by ½ of a subcarrier spacing, in order to align a center frequency of the time-domain baseband signal with a center of a subcarrier.

Furthermore, according to exemplary embodiments of the present disclosure, a distributed unit (DU) may comprise: a fronthaul interface device for receiving frequency-domain data for a plurality of component carriers from a central unit (CU); a baseband signal generation apparatus for converting the frequency-domain data for the plurality of component carriers into a time-domain baseband signal using a single inverse fast Fourier transform (IFFT) block; and a frequency converter converting the time-domain baseband signal into a radio frequency (RF) signal.

The baseband signal generation apparatus may comprise: a subcarrier mapping unit for mapping the frequency-domain data to subcarrier resources; a frequency shift unit for performing a frequency shift on the frequency domain-data allocated to the subcarrier resources; an IFFT unit for generating a time-domain signal by performing IFFT on the frequency-shifted frequency-domain data using the single IFFT block; and a cyclic prefix (CP) addition unit for generating a time-domain baseband signal by adding a CP to the time-domain signal.

The plurality of component carriers may be contiguous component carriers in frequency domain.

The baseband signal generation apparatus may further comprise a baseband frequency conversion unit for up-converting or down-converting a frequency of the time-domain baseband signal by ½ of a subcarrier spacing, in order to align a center frequency of the time-domain baseband signal with a center of a subcarrier.

The exemplary embodiments of the present disclosure provide efficient methods of generating a single baseband signal by converting a plurality of frequency-domain signals into a time-domain signal in a mobile communication system supporting multiple component carriers. Unlike the conventional techniques, since a plurality of frequency-domain signals are directly converted into a time-domain signal using only a single IFFT block, there is an advantage in that a separate circuit configuration for multiplying a time-domain signal output from each IFFT block individually existing in each component carrier by a frequency offset is not required.

BRIEF DESCRIPTION OF DRAWINGS

Exemplary embodiments of the present disclosure will become more apparent by describing in detail exemplary embodiments of the present disclosure with reference to the accompanying drawings, in which:

FIG. 6 is a table for describing allocation of subcarrier indexes for component carriers according to an exemplary embodiment of the present disclosure;

FIG. 8 is a table for describing a data throughput required by an IFFT unit according to an exemplary embodiment of the present disclosure;

FIG. 9 is a conceptual diagram illustrating an operation of a CP addition unit according to an exemplary embodiment of the present disclosure; and FIG. 10 is a block diagram illustrating a configuration of a distributed unit (DU) to which a baseband signal generation apparatus according to an exemplary embodiment of the present disclosure is applied.

DETAILED DESCRIPTION

Figure 1:
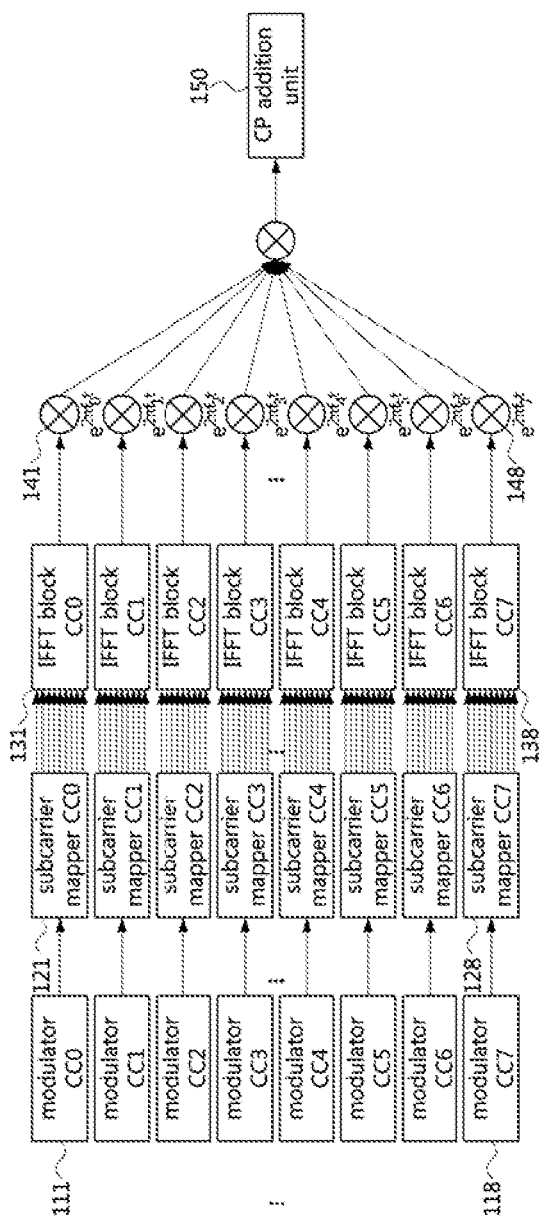
FIG. 1 is a conceptual diagram illustrating a process of generating a baseband signal in a mobile communication system to which a carrier aggregation technique is applied.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Exemplary embodiments of the present disclosure provide a baseband signal generation method performed by a distributed unit (DU) connected to a central unit (CU) installed in a local telecommunication office through a fronthaul interface in a 5G mobile communication base station system, and an apparatus performing the method.

Hereinafter, the exemplary embodiments of the present disclosure will be described in detail so that those of ordinary skill in the art may easily implement them. However, the exemplary embodiments of the present disclosure may be implemented in various different forms and are not limited to the exemplary embodiments described herein.

FIG. 1 is a conceptual diagram illustrating a process of generating a baseband signal in a mobile communication system to which a carrier aggregation technique is applied.

Referring to FIG. 1, illustrated is a process of generating a baseband signal in a mobile communication system to which a carrier aggregation technique in which eight component carriers CC0 to CC7 are aggregated and used is applied. In FIG. 1, signals to be transmitted through component carriers may be modulated into modulation symbols by modulators 111 to 118, and then output. The modulation symbols of the component carriers may be mapped to subcarriers by subcarrier mappers 121 to 128, respectively. In this case, each of the subcarrier mappers 121 to 128 may modify indexes of mapped subcarriers to correspond to input indexes of each of corresponding inverse fast Fourier transform (IFFT) blocks 131 to 138, and input the modulation symbols to each of the corresponding IFFT blocks 131 to 138.

For example, in each subcarrier mapper, a frequency shift may be applied to subcarrier indexes 0 to 1023 corresponding to 1024 subcarriers, whereby positions of the subcarriers having the indexes 512 to 1023 and positions of the subcarriers having the indexes 0 to 511 are changed with each other, and the modulation symbols corresponding to the indexes are input to each IFFF block. That is, a first half and a second half of the modulation symbols corresponding to 1024 subcarriers may be input to the IFFT block as being crossed with each other.

In each of the IFFT blocks 131 to 138, IFFT may be performed on the input modulation symbols to output a time-domain signal corresponding to each component carrier. Thereafter, the time-domain signal output from each IFFT block may be multiplied by a frequency offset corresponding to each component carrier by each of frequency offset application units 141 to 148 corresponding to each component carrier. Thereafter, the time-domain signals of the component carriers, which are respectively multiplied by the corresponding frequency offsets, may be summed to generate a carrier-aggregated baseband signal, and a cyclic prefix (CP) may be added to the carrier-aggregated baseband signal by a CP addition unit 150.

As described above, according to the prior art, when eight component carriers are aggregated, eight IFFT blocks are required, and a circuit for multiplying the time-domain signal output from each IFFT block by the frequency offset corresponding to each component carrier is required. In particular, since the frequency offset application units 141 to 148 that multiply the frequency offset in the time domain should be operated with a corresponding high operating clock at a high sampling rate of the IFFT block, there is a problem in that the complexity and cost of the circuit are increased.

Figure 2:
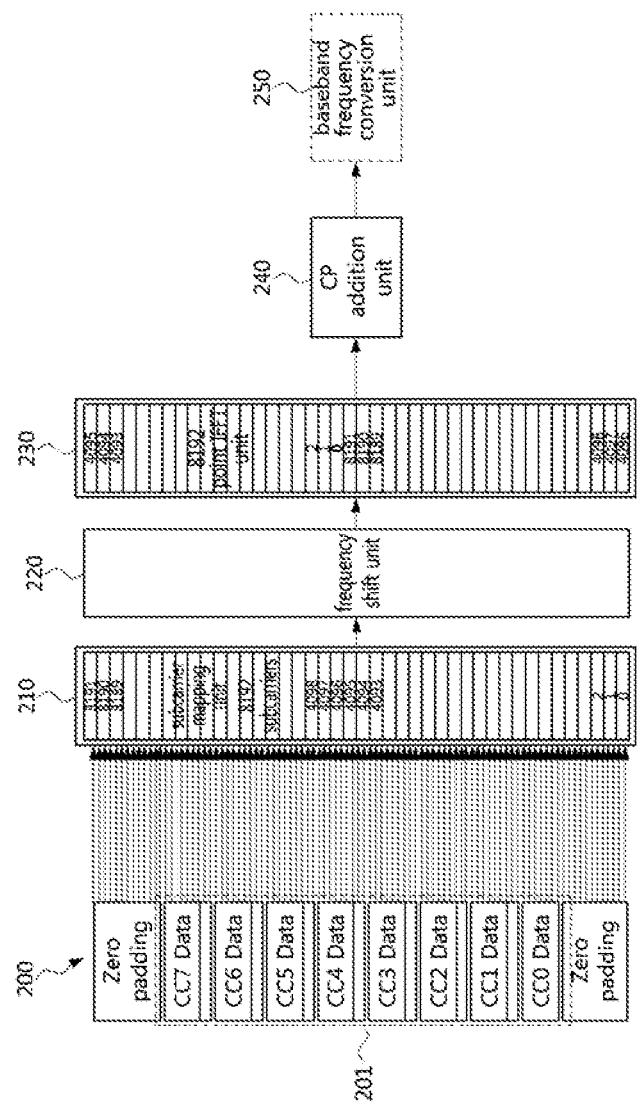
FIG. 2 is a conceptual diagram illustrating a baseband signal generation method and apparatus for a case in which carrier aggregation is applied in a mobile communication system according to an exemplary embodiment of the present disclosure.

FIG. 2 is a conceptual diagram illustrating a baseband signal generation method and apparatus for a case in which carrier aggregation is applied in a mobile communication system according to an exemplary embodiment of the present disclosure.

The baseband generation method and apparatus described with reference to FIG. 2 may be used in an open-type base station distributed unit, but they may be used also in a general base station that is not based on a CU-DU structure (that is, a structure to which function-splitting is applied). Hereinafter, a DU or a general base station to which the baseband signal generation method and apparatus are applied may be collectively referred to as a 'signal transmission apparatus'.

For convenience of description, the exemplary embodiment described below assumes a signal transmission apparatus using eight component carriers each having a bandwidth of 100 MHz in a 28 GHz band. In addition, it is assumed that the eight component carriers are contiguous in the frequency domain. However, various exemplary embodiments of the present disclosure may be easily modified and applied to systems operating in a band other than the 28 GHz band. In addition, various exemplary embodiments of the present disclosure may be easily modified and applied for component carriers having a bandwidth other than 100 MHz.

Referring to FIG. 2, a baseband signal generation apparatus 200 may receive modulated frequency-domain data 201 corresponding to eight component carriers. The frequency-domain data may be generated by a signal transmission apparatus itself (e.g., base station) including the baseband signal generation apparatus. Alternatively, when the signal transmission apparatus including the baseband signal generation apparatus is a DU, the signal transmission apparatus may receive the modulated frequency-domain data corresponding to the eight component carriers from a CU (not shown) through a fronthaul interface. In this case, the frequency-domain data corresponding to each component carrier may be composed of complex frequency-domain data (i.e., complex modulation symbols) having a 100 MHz bandwidth including a guard band according to the 5G NR specifications.

A subcarrier mapping unit 210 according to an exemplary embodiment of the present disclosure may map the frequency-domain data corresponding to eight component carriers to 8192 subcarriers so that they may be input to an IFFT unit 230 to be described later. That is, the subcarrier mapping unit 210 may serve to allocate the frequency-domain data of eight component carriers to 8192 subcarrier resources, and fill '0's to unused subcarrier resources. A guard band (GB) may exist between the respective component carriers, and the guard band may be implemented by filling '0's in corresponding subcarrier resources.

A frequency shift unit 220 may shift indexes of the subcarriers mapped to the subcarrier resources to correspond to inputs of the IFFT unit 230, and input them to the IFFT unit 230. For example, the frequency shift unit 220 may apply frequency shift to the indexes 0 to 8195 corresponding to the 8196 subcarriers to change the positions of the subcarrier indexes 4096 to 8191 and the positions of the subcarrier indexes 0 to 4095, and input them to the IFFT unit 240. That is, a first half and a second half of the frequency-domain data allocated to the subcarrier resources may cross each other and be input to the IFFT unit 230. In this case, the IFFT unit 230 may be configured as a single IFFT block.

A CP addition unit 240 may finally generate a time-domain baseband signal by adding a CP to a time-domain signal output from the IFFT unit 230. That is, the CP addition unit 240 may perform an operation of copying a certain portion at the end of the time-domain signal output from the IFFT unit 230 and attaching the copied portion to the front part of the signal, and may finally generate the time-domain baseband signal corresponding to one OFDM symbol.

Meanwhile, the baseband signal generation apparatus 200 according to an exemplary embodiment of the present disclosure may further include a baseband frequency conversion unit 250. The baseband frequency conversion unit 250 may be a component of performing up-converting or down-converting on a frequency of the time-domain baseband signal by ½ of a subcarrier spacing, so that a center frequency of the generated time-domain baseband signal is aligned with a center of the subcarrier. The baseband frequency conversion unit 250 will be described later.

Using the baseband signal generation method and apparatus according to an exemplary embodiment of the present disclosure, the frequency-domain data corresponding to eight component carriers may be directly transformed to one integrated time-domain signal by the IFFT unit 230 using only one IFFT block. When comparing the baseband signal generation method and apparatus shown in FIG. 2 with the example shown in FIG. 1, the eight IFFT blocks 131 to 138 may be replaced by the IFFT unit 230 composed of only one IFFT block. In addition, there is an advantage in that the frequency offset application units 141 to 148 for multiplying the time-domain signal output from each of the IFFT blocks 131 to 138 by the frequency offset are not required.

Figures 3, 4:
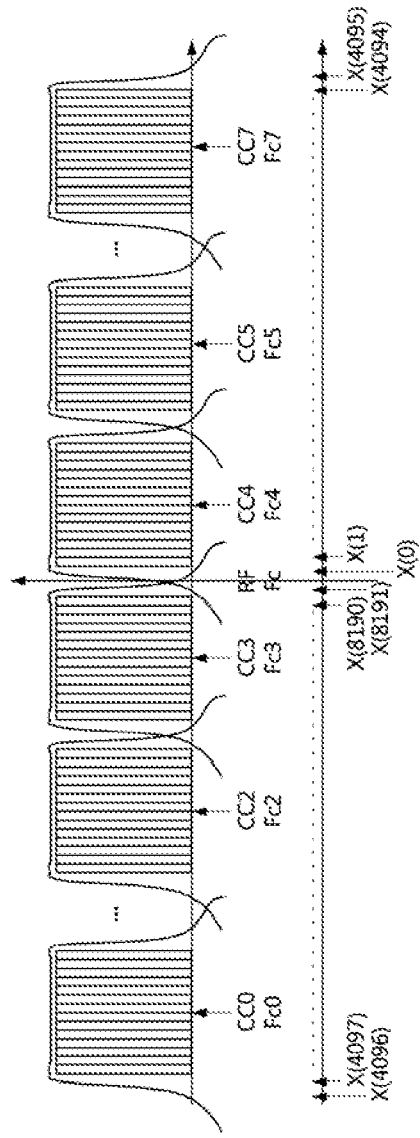
FIG. 3 is a table for describing a configuration of a component carrier according to an exemplary embodiment of the present disclosure.
FIG. 4 is a conceptual diagram illustrating an arrangement of eight component carriers in a frequency domain in a baseband signal generation method and apparatus according to an exemplary embodiment of the present disclosure.

FIG. 3 is a table for describing a configuration of a component carrier according to an exemplary embodiment of the present disclosure.

Referring to FIG. 3, a subcarrier spacing (SCS) of each component carrier according to an exemplary embodiment of the present disclosure may be configured as 120 KHz, and a sampling rate of 122.88 MHz may be used. Since a total of 66 resource blocks (RBs) are used for data transmission, a total of 792 (=12×66) subcarriers may be used for data transmission, and the corresponding frequency bandwidth may be 95.040 MHz. Accordingly, when a guard band is included, a bandwidth of about 100 MHz per component carrier may be used.

FIG. 4 is a conceptual diagram illustrating an arrangement of eight component carriers in a frequency domain in a baseband signal generation method and apparatus according to an exemplary embodiment of the present disclosure.

In a system using a 28 GHz band, an 8192 point IFFT block may be used to support eight component carriers each having a 100 MHz bandwidth, so that 8192 subcarrier resources may exist. In the NR system, for intra-band contiguously aggregated carriers in the 28 GHz band, a nominal channel spacing between adjacent component carriers each having a 100 MHz bandwidth may be determined by Equation 1 according to the 3GPP TS38.104 specification.

$$\text{Nominal channel spacing} = \left[ \frac{BW_{channel(1)} + BW_{Channel(2)} - 2|GB_{Channel(1)} - GB_{Channel(2)}|}{0.06 * 2^{n+1}} \right] 0.06 * 2^n \text{ (MHz)} \quad \text{[Equation 1]}$$

$$n = \mu_0 - 2$$

Here, $BW_{channel(1)}$ and $BW_{channel(2)}$ may be 100 MHz as a base station channel bandwidth, $\mu_0$ may be 3 corresponding to 120 KHz SCS, and $GB_{channel(1)}$ may be 2420 KHz as a minimum guard band. According to a calculation result using Equation 1, the nominal channel spacing may be 99.96 MHz, and consists of a data transmission band of 95.04 MHz and a guard band of 4.920 MHz.

Hereinafter, a configuration of the subcarrier mapping unit 210 described above and the role of the baseband frequency conversion unit 250 will be described.

Figure 5:
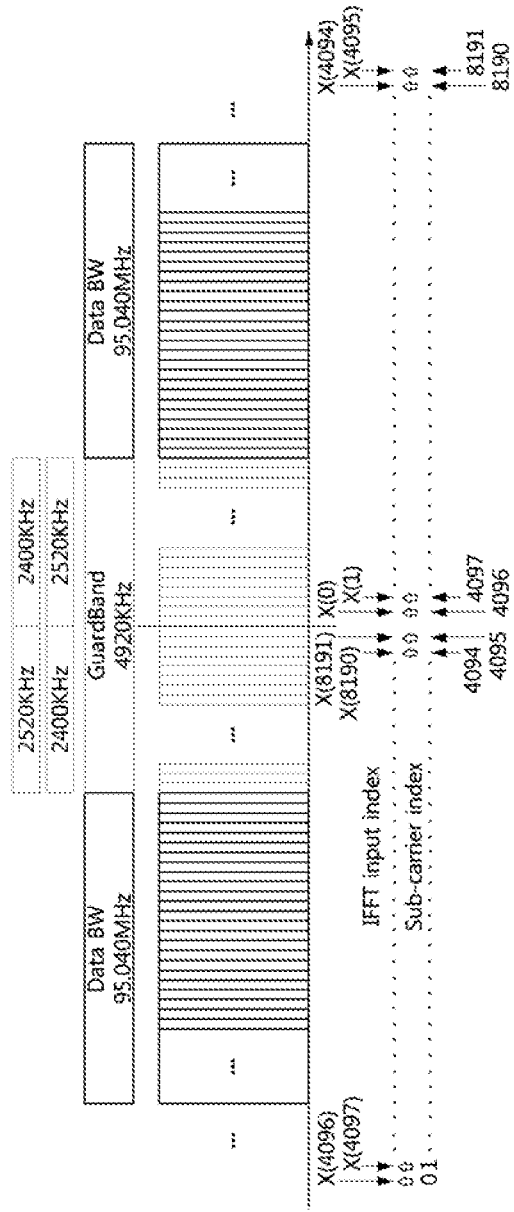
FIG. 5 is a conceptual diagram illustrating two adjacent component carriers located at a center frequency.

FIG. 5 is a conceptual diagram illustrating two adjacent component carriers located at a center frequency.

Referring to FIG. 5, a frequency spacing between two component carriers may be set to a value larger than the minimum guard band and less than the nominal channel spacing, in units of 120 KHz corresponding to a least common multiple of 60 KHz that is a channel raster and 120 KHz that is a subcarrier spacing. In case of the 28 GHz band system, as shown in FIG. 5, a guard band of 4920 kHz may be configured, and 4920 kHz may correspond to 41 subcarriers. Accordingly, the subcarrier mapping unit 210 may be implemented to perform fixed mapping.

Meanwhile, since a center frequency should be aligned with a center of the subcarrier, the mapped subcarriers may be moved to a right (i.e., to a higher frequency) or left (i.e., to a lower frequency) by ½ of the subcarrier spacing (i.e., 60 KHz), not to the center of the entire RF band. Such the movement direction may be determined at a design stage. Accordingly, in the baseband signal generation method and apparatus according to an exemplary embodiment of the present disclosure, the frequency of the time-domain baseband signal output from the CP addition unit 240 may be up-converted or down-converted by 60 kHz through the baseband frequency conversion unit 250.

Accordingly, in an exemplary embodiment of the present disclosure, 20 (i.e., 2420 kHz) of the total 41 guard band subcarriers may be located on the left (or right) of the center frequency, and 21 (e.g., 2540 kHz) of the total 41 guard band subcarriers may be located on the right (or left) of the center frequency, so that the center frequency may be easily aligned with the center of the subcarrier. That is, when 20 of the 41 guard band subcarriers are located on the left of the center frequency, the time-domain baseband signal output from the CP addition unit 240 may be shifted by 60 kHz to the left (i.e., to the lower frequency) through the baseband frequency conversion unit 250. On the other hand, when 20 of the 41 guard band subcarriers are located on the right of the center frequency, the time-domain baseband signal output from the CP addition unit 240 may be shifted by 60 kHz to the right (i.e., to the higher frequency) by 60 kHz through the baseband frequency conversion unit 250.

FIG. 6 is a table for describing allocation of subcarrier indexes for component carriers according to an exemplary embodiment of the present disclosure. Referring to FIG. 6, a correspondence between the subcarrier indexes and the IFFT input indexes when a frequency spacing for the respective component carriers each having the 100 MHz bandwidth is 99.960 MHz and the center frequency is moved by 60 KHz to the left is described. In the above example, when the frequency spacing for each component carrier is 99.960 MHz, a transmission bandwidth of 95.040 MHz and a guard band of 4.920 MHz may be configured. 95.040 MHz may consist of 792 subcarriers, and 4.840 MHz may consist of 41 subcarriers.

Hereinafter, the frequency shift unit 220 described above will be described in detail.

Figure 7:
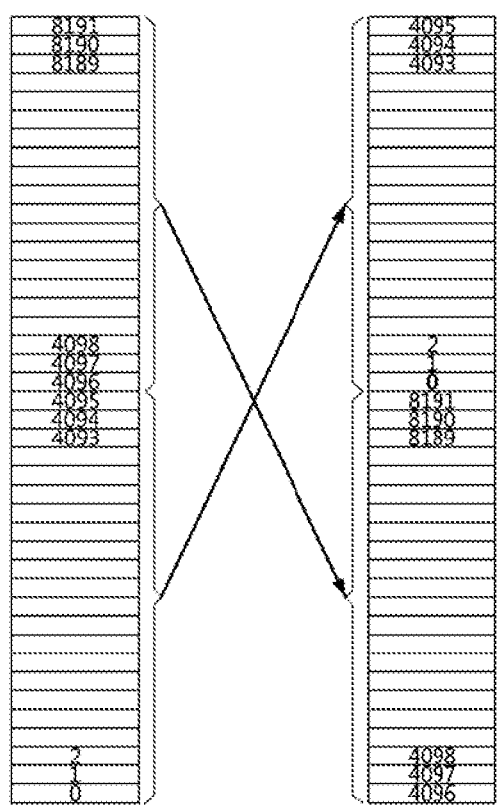
FIG. 7 is a conceptual diagram illustrating a role of a frequency shift unit according to an exemplary embodiment of the present disclosure.

FIG. 7 is a conceptual diagram illustrating a role of a frequency shift unit according to an exemplary embodiment of the present disclosure.

As described above, the subcarrier indexes may be sequentially arranged in frequency order from 0 to 8191, and the frequency shift unit 220 may divide the subcarrier indexes 0 to 8191 in half and performs a frequency shift on them so that a first half and a second half of them are crossed with each other, and input to the IFFT unit 230. That is, the frequency shift unit 220 may perform the frequency shift so that a first half and a second half of the frequency-domain data allocated to the subcarrier resources cross each other, and they are input to the IFFT block.

The frequency shift unit 220 may generate input data suitable for the IFFT unit 230 by moving a zero frequency component (direct current (DC) component) to the center of the spectrum. For example, the operation of the frequency shift unit 220 for the 8192 point IFFT block used in the signal transmission apparatus of the 28 GHz band system may be expressed by the following pseudocode.

If (subcarrier index <4096) then
FFT input index=subcarrier index+4096;
Else
FFT input index=subcarrier index−4096;

Meanwhile, the IFFT unit 230 may use various types of architectures to optimize a throughput or area. For example, a required throughput may be achieved using an IFFT architecture that supports vector input data, which is an optimized architecture for achieving giga samples per second (Gsps) level throughput.

FIG. 8 is a table for describing a data throughput required by an IFFT unit according to an exemplary embodiment of the present disclosure.

Referring to FIG. 8, when an IFFT block exists for each 100 MHz component carrier as described in the prior arts, a 1024 point IFFT block should be used for a subcarrier spacing of 120 kHz. In addition, in order to process a sampling clock of 122.88 MHz, the IFFT block should also operate with an operating clock of 122.88 MHz.

Therefore, in order to process the 800 MHz frequency bandwidth corresponding to the eight component carriers, a sampling clock of 983.04 MHz is required, and the IFFT unit 230 using a single 8192 point IFFT block should also operate with an operating clock of 983.04 MHz. Since such the high operation speed cannot be implemented in a field programmable gate array (FPGA), the IFFT may be performed with an operating clock of 122.88 MHz based on a vector input scheme that simultaneously inputs 8 inputs per clock to lower the operating clock, and thus data may be processed at a rate of 983.04 mega samples per second (Msps).

Hereinafter, the CP addition unit 240 described above will be described in detail.

Finally, an OFDM symbol transformed from the frequency domain to the time domain using the 8192 point IFFT block may be composed of 8192 data samples.

FIG. 9 is a conceptual diagram illustrating an operation of a CP addition unit according to an exemplary embodiment of the present disclosure.

In the NR system, when a 120 kHz SCS is applied, there are 4 slots every 0.5 ms, and each slot may consist of 14 symbols. Each of the symbols except the first symbol of 0.5 ms has 8768 samples including 576 CP samples and 8192 data samples, and the first symbol of 0.5 ms has 9280 samples including 1088 CP samples and 8192 data samples.

Referring to FIG. 9, for the first symbol of 0.5 ms, the CP addition unit may generate the symbol having a total of 9280 samples by copying 1088 samples in the rear portion of 8192 IFFT output samples and attaching them to the front part thereof. In addition, for each of the symbols excluding the first symbol of 0.5 ms, the CP addition unit may generate the symbol having a total of 8768 samples by attaching 576 samples in the rear portion of 8192 IFFT output samples to the front part thereof.

FIG. 10 is a block diagram illustrating a configuration of a distributed unit (DU) to which a baseband signal generation apparatus according to an exemplary embodiment of the present disclosure is applied.

Referring to FIG. 10, a DU 1000 according to an exemplary embodiment of the present disclosure may include a fronthaul interface device 1010 for receiving frequency-domain data for a plurality of component carriers from a central unit (CU), a baseband signal generation apparatus 1020 for converting the frequency-domain data for the plurality of component carriers into a time-domain baseband signal by using a single IFFT block; and a frequency converter 1030 for converting the time-domain baseband signal into a radio frequency (RF) signal.

The DU according to an exemplary embodiment of the present disclosure may be implemented as an O-RAN DU (O-DU) according to an open radio access network alliance (O-RAN) standard. In addition, a CU connected to the DU through a fronthaul interface may be implemented as an O-RAN CU (O-CU). In this case, the fronthaul interface device may be configured as an interface device conforming to the O-RAN fronthaul standard.

The baseband signal generation apparatus 1020 may be a device corresponding to the baseband signal generation apparatus 200 described with reference to FIG. 2. That is, the baseband signal generation apparatus 1020 may include the subcarrier mapping unit 210, the frequency shift unit 220, the IFFT unit 230, and the CP addition unit 240. In addition, the baseband signal generation apparatus 1020 may further include the baseband frequency conversion unit 250.

Meanwhile, the above-described baseband signal generation apparatus 1020 may include at least one processor and a memory that stores instructions executed by the at least one processor. In this case, the subcarrier mapping unit 210, the frequency shift unit 220, the IFFT unit 230, and the CP addition unit 240 may be configured with program codes implemented by the instructions. Alternatively, some of the subcarrier mapping unit 210, the frequency shift unit 220, the IFFT unit 230, and the CP addition unit 240 may configured as a dedicated logic circuit, and the remaining components may be configured with program codes implemented by the instructions.

Finally, the frequency converter 1030 may be a device that converts the time-domain baseband signal generated by the baseband signal generation apparatus 1020 into an RF signal. The RF signal may be transmitted through an amplifier and an antenna(s).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A baseband signal generation method performed by a signal transmission apparatus, the baseband signal generation method comprising:
   mapping frequency-domain data for a plurality of component carriers to subcarrier resources;
   performing a frequency shift on the frequency domain-data allocated to the subcarrier resources;
   generating a time-domain signal by performing inverse fast Fourier transform (IFFT) on the frequency-shifted frequency-domain data using a single IFFT block;
   generating a time-domain baseband signal by adding a cyclic prefix (CP) to the time-domain signal; and
   in order to align a center frequency of the time-domain baseband signal with a center of a subcarrier, up-converting or down-converting a frequency of the time-domain baseband signal by ½ of a subcarrier spacing.

2. The baseband signal generation method according to claim 1, wherein the plurality of component carriers are contiguous component carriers in frequency domain.

3. The baseband signal generation method according to claim 1, wherein when the signal transmission apparatus is a distributed unit (DU), the frequency-domain data is received from a central unit (CU) through a fronthaul interface.

4. The baseband signal generation method according to claim 1, wherein each of the plurality of component carriers has a data transmission band of 95.04 MHz and a guard band of 4.920 MHz.

5. The baseband signal generation method according to claim 4, wherein each of the plurality of component carriers has a 120 Khz subcarrier spacing (SCS), the data transmission band is composed of 792 subcarriers, and the guard band is composed of 41 subcarriers.

6. The baseband signal generation method according to claim 1, wherein in the performing of the frequency shift, the frequency shift is performed so that a first half and a second half of the frequency-domain data allocated to the subcarrier resources are input to the IFFT block as being crossed with each other.

7. The baseband signal generation method according to claim 1, wherein the IFFT block uses a vector input scheme that receives multiple inputs per clock.

8. A baseband signal generation apparatus comprising:
   a subcarrier mapping unit for mapping frequency-domain data for a plurality of component carriers to subcarrier resources;
   a frequency shift unit for performing a frequency shift on the frequency domain-data allocated to the subcarrier resources;
   an inverse fast Fourier transform (IFFT) unit for generating a time-domain signal by performing IFFT on the frequency-shifted frequency-domain data using a single IFFT block;
   a cyclic prefix (CP) addition unit for generating a time-domain baseband signal by adding a CP to the time-domain signal: and
   a baseband frequency conversion unit for up-converting or down-converting a frequency of the time-domain baseband signal by ½ of a subcarrier spacing, in order to align a center frequency of the time-domain baseband signal with a center of a subcarrier.

9. The baseband signal generation apparatus according to claim 8, wherein the plurality of component carriers are contiguous component carriers in frequency domain.

10. The baseband signal generation apparatus according to claim 8, wherein when the signal transmission apparatus is a distributed unit (DU), the frequency-domain data is received from a central unit (CU) through a fronthaul interface.

11. The baseband signal generation apparatus according to claim 8, wherein each of the plurality of component carriers has a data transmission band of 95.04 MHz and a guard band of 4.920 MHz.

12. The baseband signal generation apparatus according to claim 11, wherein each of the plurality of component carriers has a 120 Khz subcarrier spacing (SCS), the data transmission band is composed of 792 subcarriers, and the guard band is composed of 41 subcarriers.

13. The baseband signal generation apparatus according to claim 8, wherein the frequency shift unit performs the frequency shift so that a first half and a second half of the frequency-domain data allocated to the subcarrier resources are input to the IFFT block as being crossed with each other.

14. The baseband signal generation apparatus according to claim 8, wherein the IFFT block uses a vector input scheme that receives multiple inputs per clock.

15. A distributed unit (DU) comprising:
   a fronthaul interface device for receiving frequency-domain data for a plurality of component carriers from a central unit (CU);
   a baseband signal generation apparatus for converting the frequency-domain data for the plurality of component carriers into a time-domain baseband signal using a single inverse fast Fourier transform (IFFT) block; and
   a frequency converter converting the time-domain baseband signal into a radio frequency (RF) signal,
   wherein the baseband signal generation apparatus further comprises a baseband frequency conversion unit for up-converting or down-converting a frequency of the time-domain baseband signal by ½ of a subcarrier spacing, in order to align a center frequency of the time-domain baseband signal with a center of a subcarrier.

16. The DU according to claim 15, wherein the baseband signal generation apparatus comprises:
   a subcarrier mapping unit for mapping the frequency-domain data to subcarrier resources;
   a frequency shift unit for performing a frequency shift on the frequency domain-data allocated to the subcarrier resources;

an IFFT unit for generating a time-domain signal by performing IFFT on the frequency-shifted frequency-domain data using the single IFFT block; and a cyclic prefix (CP) addition unit for generating a time-domain baseband signal by adding a CP to the time-domain signal.

17. The DU according to claim 15, wherein the plurality of component carriers are contiguous component carriers in frequency domain.

\* \* \* \* \*